United States Patent
Terazawa

(10) Patent No.: US 9,610,976 B2
(45) Date of Patent: Apr. 4, 2017

(54) LANE DEPARTURE PREVENTION CONTROL SYSTEM FOR VEHICLE

(71) Applicant: FUJI JUKOGYO KABUSHIKI KAISHA, Tokyo (JP)

(72) Inventor: Takeshi Terazawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/856,391

(22) Filed: Sep. 16, 2015

(65) Prior Publication Data

US 2016/0075334 A1 Mar. 17, 2016

(30) Foreign Application Priority Data

Sep. 17, 2014 (JP) .................................. 2014-189288

(51) Int. Cl.
*B62D 15/02* (2006.01)
*B62D 6/04* (2006.01)

(52) U.S. Cl.
CPC .............. *B62D 15/025* (2013.01); *B62D 6/04* (2013.01)

(58) Field of Classification Search
CPC .................................. B62D 6/04; B62D 15/025
See application file for complete search history.

(56) References Cited

U.S. PATENT DOCUMENTS

| 6,185,485 B1 * | 2/2001 | Ashrafi | ................ B60T 8/1755 180/197 |
| 8,423,246 B2 * | 4/2013 | Takeda | ................ B60W 50/16 180/443 |
| 8,571,758 B2 * | 10/2013 | Klier | ................ B62D 7/159 180/197 |

(Continued)

FOREIGN PATENT DOCUMENTS

| CN | 103832435 A | 6/2014 |
| JP | 07-105498 A | 4/1995 |

(Continued)

OTHER PUBLICATIONS

First Office Action Chinese Patent Application No. 201510575704.6 dated Oct. 10, 2016 with full English translation.

*Primary Examiner* — Todd Melton
(74) *Attorney, Agent, or Firm* — McDermott Will & Emery LLP

(57) ABSTRACT

A lane departure prevention control system for a vehicle includes: a lane detector that detects a lane on which the vehicle travels; a disturbance information detector that detects information on disturbance applied to the vehicle; a correction module that corrects position information of a departure determination line used for determining whether the vehicle departs from the lane, based on at least the information on the disturbance applied to the vehicle; a departure predictor that makes a prediction of departure from the lane, based on position information on the departure determination line and a travelling state, the position (Continued)

information being corrected by the correction module; a target turn amount calculator that calculates a target turn amount to be applied to the vehicle, required for preventing departure from the lane based on the prediction of the departure from the lane; and a target turn amount generator that generates the target turn amount.

9 Claims, 9 Drawing Sheets

(56) References Cited

U.S. PATENT DOCUMENTS

| | | | |
|---|---|---|---|
| 8,645,026 B2 * | 2/2014 | Bar | B62D 6/04 |
| | | | 701/42 |
| 8,825,355 B2 * | 9/2014 | Nakano | B62D 6/00 |
| | | | 180/422 |
| 9,098,086 B2 * | 8/2015 | Humphrey | B62D 15/025 |
| 9,327,764 B2 * | 5/2016 | Limpibunterng | B62D 15/025 |
| 9,371,088 B2 * | 6/2016 | Tamura | B62D 5/046 |
| 9,393,995 B2 * | 7/2016 | Banno | B62D 6/04 |
| 2012/0197496 A1 * | 8/2012 | Limpibunterng | B62D 1/286 |
| | | | 701/42 |
| 2015/0025745 A1 * | 1/2015 | Tamura | B62D 5/046 |
| | | | 701/41 |
| 2015/0345959 A1 * | 12/2015 | Meuleau | G05D 1/0212 |
| | | | 701/23 |

FOREIGN PATENT DOCUMENTS

| | | | |
|---|---|---|---|
| JP | 11-073597 A | | 3/1999 |
| JP | 2005-145336 A | | 6/2005 |
| JP | 2005-157754 A | | 6/2005 |
| JP | 2009-208601 A | | 9/2009 |
| KR | 20140064387 A | * | 5/2014 |

* cited by examiner

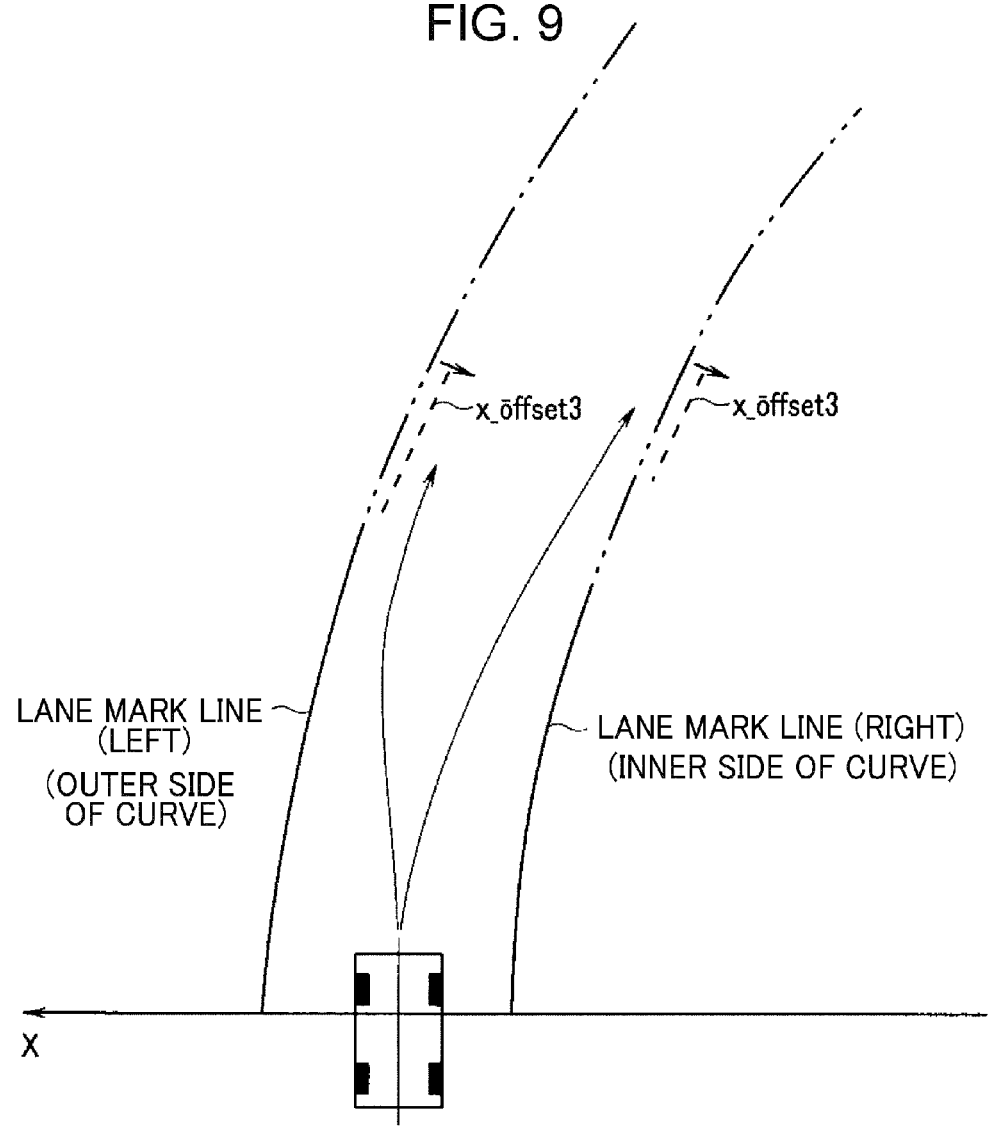

LANE DEPARTURE PREVENTION CONTROL SYSTEM FOR VEHICLE

CROSS-REFERENCE TO RELATED APPLICATIONS

The present application claims priority from Japanese Patent Application No. 2014-189288 filed on Sep. 17, 2014, the entire contents of which are hereby incorporated by reference.

BACKGROUND

1. Technical Field

The present invention relates to a lane departure prevention control system for a vehicle that prevents departure from a travelling lane by activating an actuator to apply yawing moment to the vehicle when the vehicle is likely to depart from the travelling lane.

2. Related Art

In recent years, various vehicle drive assist devices have been developed and put into practical use, and a lane departure prevention control system that prevents a vehicle from departing from a lane is one of such devices. For example, Japanese Unexamined Patent Application Publication (JP-A) No. H7-105498 discloses a technique related to a travelling state determining device for a vehicle that predicts a state of departure from a lane based on a distance between the vehicle and an intersection between an estimated moving path and a side edge of a lane and on an angle between the estimated moving path and the side edge at the intersection, and corrects the steering automatically in order to prevent departure based on the prediction.

SUMMARY

However, the vehicle travelling state determining device for a vehicle disclosed in JP-A No. H7-105498 predicts the state of departure from the lane based on the distance between the vehicle and the intersection between the estimated moving path and the side edge of the lane and on the angle between the estimated moving path and the side edge at the intersection only. Thus, for example, if a transverse disturbance such as a cant acts on the vehicle, it is difficult to predict the state of departure accurately and control errors may occur.

Thus, for example, JP-A (JP-A) No. 2005-145336 discloses a technique related to a lane departure preventing device in which departure prevention control starts earlier than as usual when a vehicle equipped with the device tends to depart from a lane toward the down-slope of a cant whereas departure prevention control starts later than as usual when the vehicle tends to depart from a lane toward the up-slope of a cant.

However, the technique of the lane departure preventing device disclosed in JP-A No. 2005-145336 adjusts the start time of departure prevention control only. Thus, it is not possible to optimize a travelling path to prevent departure from a lane when a transverse disturbance such as a cant acts on the vehicle. That is, even if the vehicle travels on a flat road, an up-slope of a cant, or a down-slope of a cant, a gravity component acts on the center of the vehicle and a travelling path changes depending on the state of a cant of the road surface so that the travelling path varies after the departure prevention control starts. Thus, when the vehicle departs from the lane in the downward direction of a cant, the vehicle travels along an outer track than that when the vehicle travels on a flat road due to the transverse force of a gravity component, and it is difficult to obtain a sufficient departure prevention effect (that is, it is not possible to prevent a lane departure appropriately). Moreover, when the vehicle departs from the lane in the upward direction of a cant, the vehicle travels along an inner track than that when the vehicle travels on a flat road due to the transverse force of a gravity component. Thus, the driver of the vehicle may feel a sense of incongruity.

It is desirable to provide a lane departure prevention control system for a vehicle capable of preventing a lane departure reliably without giving a driver of the vehicle a sense of incongruity by maintaining an optimal path that prevents lane departure even when the vehicle departs from the lane in the upward or downward direction of the cant under a state where a transverse disturbance such as a cant acts on the vehicle.

An aspect of the present invention provides a lane departure prevention control system for vehicle including: a lane detector that detects a lane on which the vehicle travels; a disturbance information detector that detects information on disturbance applied to the vehicle; a correction module that corrects position information of a departure determination line used for determining whether the vehicle departs from the lane, based on at least the information on disturbance applied to the vehicle; a departure predictor that make a prediction of departure from the lane, based on position information on the departure determination line and a travelling state, the position information being corrected by the correction module; a target turn amount calculator that calculates a target turn amount to be applied to the vehicle, required for preventing departure from the lane based on the prediction of the departure from the lane; and a target turn amount generator that generates the target turn amount to the vehicle.

BRIEF DESCRIPTION OF THE DRAWINGS

FIGS. 6A and 6B illustrate examples of characteristics of a third offset amount x_offset3 according to the implementation of the present invention, in which FIG. 6A illustrates an example of characteristics of the third offset amount x_offset3 when a vehicle departs from a lane toward the outer side of a curve and FIG. 6B illustrates an example of characteristics of the third offset amount x_offset3 when a vehicle departs from a lane toward the inner side of a curve;

FIGS. 8A and 8B illustrates lane mark lines offset by the second offset amount x_offset2 illustrated in FIG. 5, in which FIG. 8A illustrates a lane having a larger lane width than a preset value and FIG. 8B illustrates a lane having a smaller lane width than the preset value; and FIG. 9 illustrates lane mark lines offset by the third offset amount x_offset3 illustrated in FIGS. 6A and 6B.

DETAILED DESCRIPTION

Hereinafter, an implementation of the present invention will be described with reference to the drawings.

Figure 1:
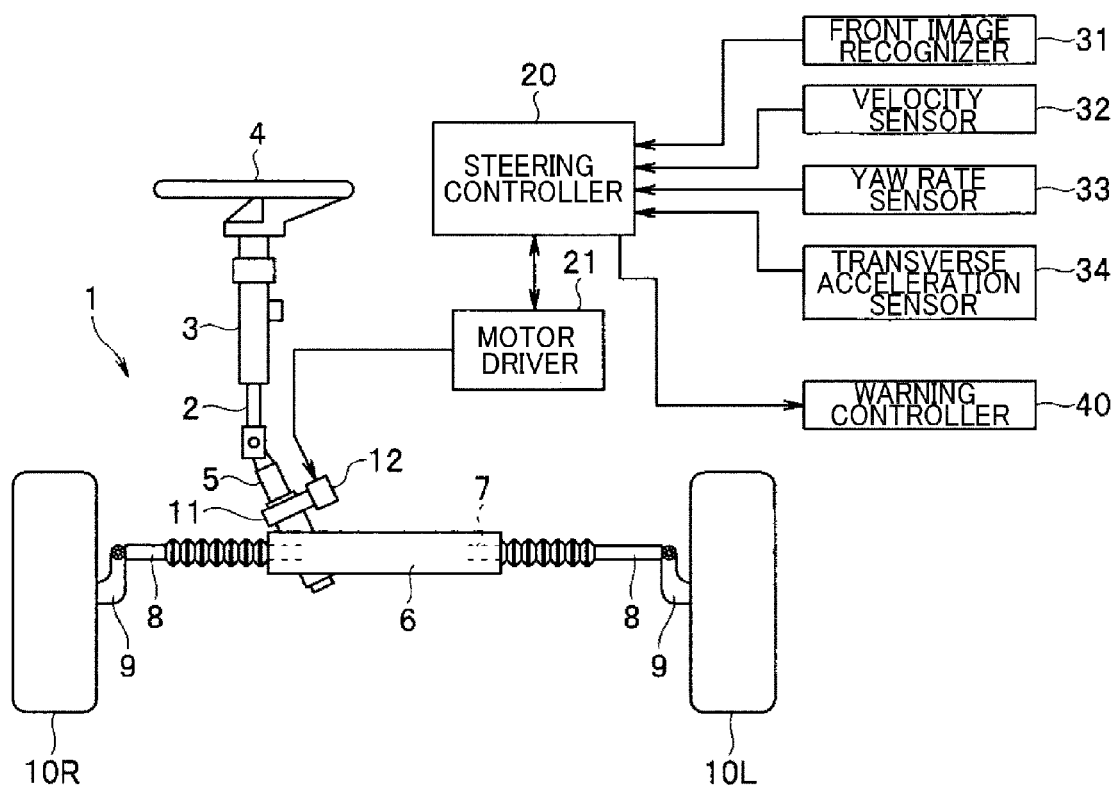
FIG. 1 illustrates a configuration of a steering system of a vehicle according to an implementation of the present invention.

Referring to FIG. 1, reference numeral 1 denotes an electric power steering device of a vehicle applying the implementation. The electric power steering device 1 is capable of setting a steering angle independently from a driver input. The electric power steering device 1 has a steering shaft 2 that is rotatably supported by a body frame (not illustrated) with a steering column 3 interposed. One end of the steering shaft 2 is extended to a driver's seat and the other end is extended to an engine compartment. A steering wheel 4 is fixed to the steering shaft 2 at the end ofon the side of the driver's seat, and a pinion shaft 5 is coupled to the end on the side of the engine compartment.

A steering gearbox 6 extending in a vehicle width direction is disposed in the engine compartment, and a rack shaft 7 is inserted into and supported by the steering gearbox 6 so as to be capable of reciprocation. A pinion formed in the pinion shaft 5 engages with a rack (not illustrated) formed in the rack shaft 7 whereby a rack-and-pinion-type steering gear mechanism is formed.

Respective left and right ends of the rack shaft 7 protrude from the ends of the steering gearbox 6, and front knuckles 9 are coupled to the ends with a tie rod 8 interposed. The front knuckles 9 support respective left and right wheels 10L and 10R as steered wheels so as to rotate and are steerably supported on the body frame. Thus, when a driver operates the steering wheel 4 to rotate the steering shaft 2 and the pinion shaft 5, the rack shaft 7 moves in the left-right direction in response to the rotation of the pinion shaft 5, and as the result of the movement, the front knuckles 9 turn about a kingpin shaft (not illustrated), whereby the left and right wheels 10L and 10R are steered in the left-right direction.

An electric power steering motor (electric motor) 12 is coupled to the pinion shaft 5 via an assist transmission mechanism 11. The electric motor 12 assists a steering torque applied to the steering wheel 4 and applies a steering torque that helps to obtain a target turn amount (for example, a target yaw rate). The electric motor 12 is driven by a motor driver 21 that receives a target torque Tp from a steering controller 20 (described later) as a control output value.

The steering controller 20 includes an electric power steering control function of assisting the steering power of a driver, a lane keep control function of allowing a vehicle to travel along a target moving path, a lane departure prevention control function of preventing departure from lane mark lines (left and right lane lines) of a lane, and other functions. In one implementation, the lane mark lines may serve as "departure determination lines". In the following description, a configuration related to the lane departure prevention control function will be described in particular.

The steering controller 20 is coupled to a front image recognizer 31 that detects lane mark lines (left and right lane lines) to acquire lane information and information on an attitude angle and a position of the vehicle in relation to the lane, from the lane mark lines. In one implementation, the front image recognizer 31 may serve as "a lane detector". Moreover, a velocity sensor 32 that detects a vehicle velocity V, a yaw rate sensor 33 that detects a yaw rate γ, and a transverse acceleration sensor 34 that detects a transverse acceleration G are coupled to the steering controller 20.

The front image recognizer 31 includes a pair of CCD cameras and a stereo image processor. The CCD cameras are attached, at a certain distance from each other, to the front side of the ceiling of a vehicle cabin, for example, to capture stereo images of an object outside the vehicle from different points of view. The stereo image processor that processes image data supplied from the CCD cameras.

The stereo image processor of the front image recognizer 31 processes the image data supplied from the CCD cameras in the following manner. First, the stereo image processor obtains distance information from an amount of deviation of the positions corresponding to a set of pairs of stereo images in the travelling direction of the vehicle captured by the CCD cameras to generate a distance image.

Figure 3:
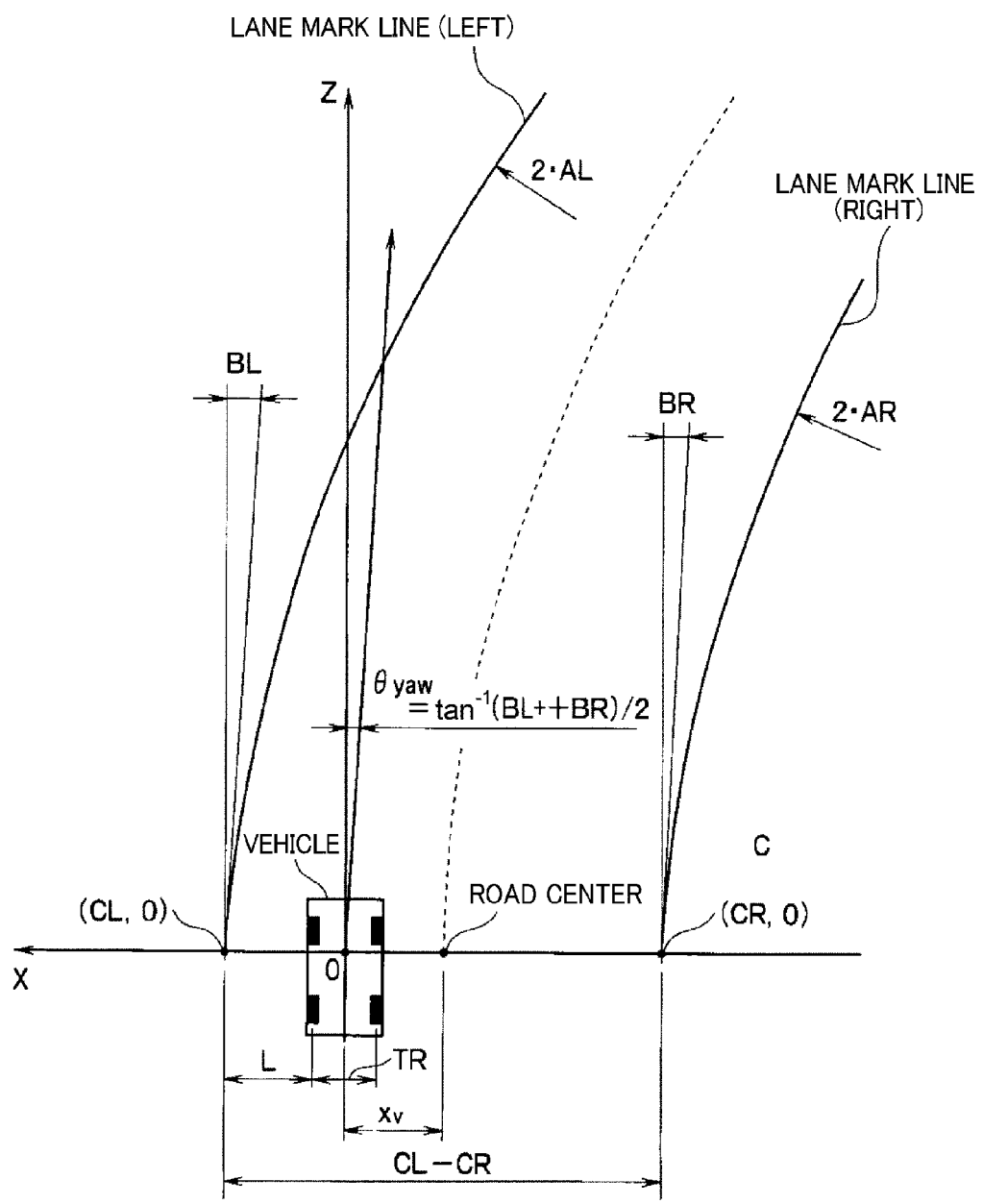
FIG. 3 illustrates a vehicle applying the implementation of the present invention and a lane on an X-Z coordinate and respective parameters according to the implementation.

In recognition of lane line data, based on knowledge that lane lines have a higher brightness than a road surface, a change in brightness in a road width direction is evaluated, and the positions of the left and right lane lines are determined on an image plane. The position (x,y,z) of the lane line on the actual space is calculated by a known coordinate transformation equation based on the position (i,j) on the image plane and a parallax calculated for this position (that is, based on distance information). In the present implementation, a coordinate system of the actual space set based on the position of the vehicle is defined such that, for example but not limited to, as illustrated in FIG. 3, a road surface immediately below a middle point between the CCD cameras is the origin, a vehicle width direction is an X-axis (the left side is "+"), a vehicle height direction is a Y-axis (the upper side is "+"), and a vehicle length direction (distance direction) is a Z-axis (the forward direction is "+"). In this case, when the road is flat, the X-Z plane (Y=0) is identical to the road surface. A road model is represented by dividing a lane of the vehicle on a road into a plurality of segments in the distance direction, approximating the left and right lane lines in the respective segments in a predetermined manner, and connecting the approximated segments. In the present implementation, a lane shape is recognized based on images obtained by the set of CCD cameras. However, the lane shape may be recognized based on image information obtained by another type of camera, such as, but not limited to, a monocular camera and a color camera.

The steering controller 20 calculates a yaw angle (hereinafter referred to as a lane yaw angle) θyaw of the vehicle in relation to a lane based on the lane mark line position information and the respective sensor signals. The steering controller 20 further calculates a vehicle position (lane-width-direction vehicle transverse position) xv in the width direction of the lane. The steering controller 20 further calculates an expected lane departure time in which the vehicle is expected to depart from the lane on the condition that the vehicle travels in the present travelling state as a basic expected lane departure time Tttlc0. The steering controller 20 further calculates a lane-direction distance Lz that the vehicle travels until the vehicle departs from the lane. The steering controller 20 further calculates a correction amount of the position (that is, the distance (lane mark line-to-vehicle distance) L from the lane mark line to the vehicle) of a lane mark line from which the vehicle departs, corresponding to a transverse disturbance Fxd0 resulting from a cant of a travelling path as a first offset amount x_offset1. The steering controller 20 further calculates a correction amount of the lane-mark-line-to-vehicle distance L corresponding to a lane width W as a second offset amount x_offset2. The steering controller 20 further calculates a correction amount of the lane mark line-to-vehicle distance L corresponding to a lane shape (curve curvature κ) as a third offset amount x_offset3. The steering controller 20 further calculates the expected lane departure time Tttlc based on the lane-mark-line-to-vehicle distance L corrected based on the first, second, and third offset amounts x_offset1, x_offset2, and x_offset3. The steering controller 20 further calculates a target yaw rate γt as a target turn amount and calculates a target torque Tp. The steering controller 20 outputs these calculated values to the motor driver 21 of the electric power steering device 1 and drives and controls the electric power steering motor 12. In one implementation, in this manner, the steering controller 20 may serve as a disturbance information detector, a correction module, a departure predictor, and a target turn amount calculator. In one implementation the electric power steering device 1 may serve as a target turn amount generator.

Figure 2:
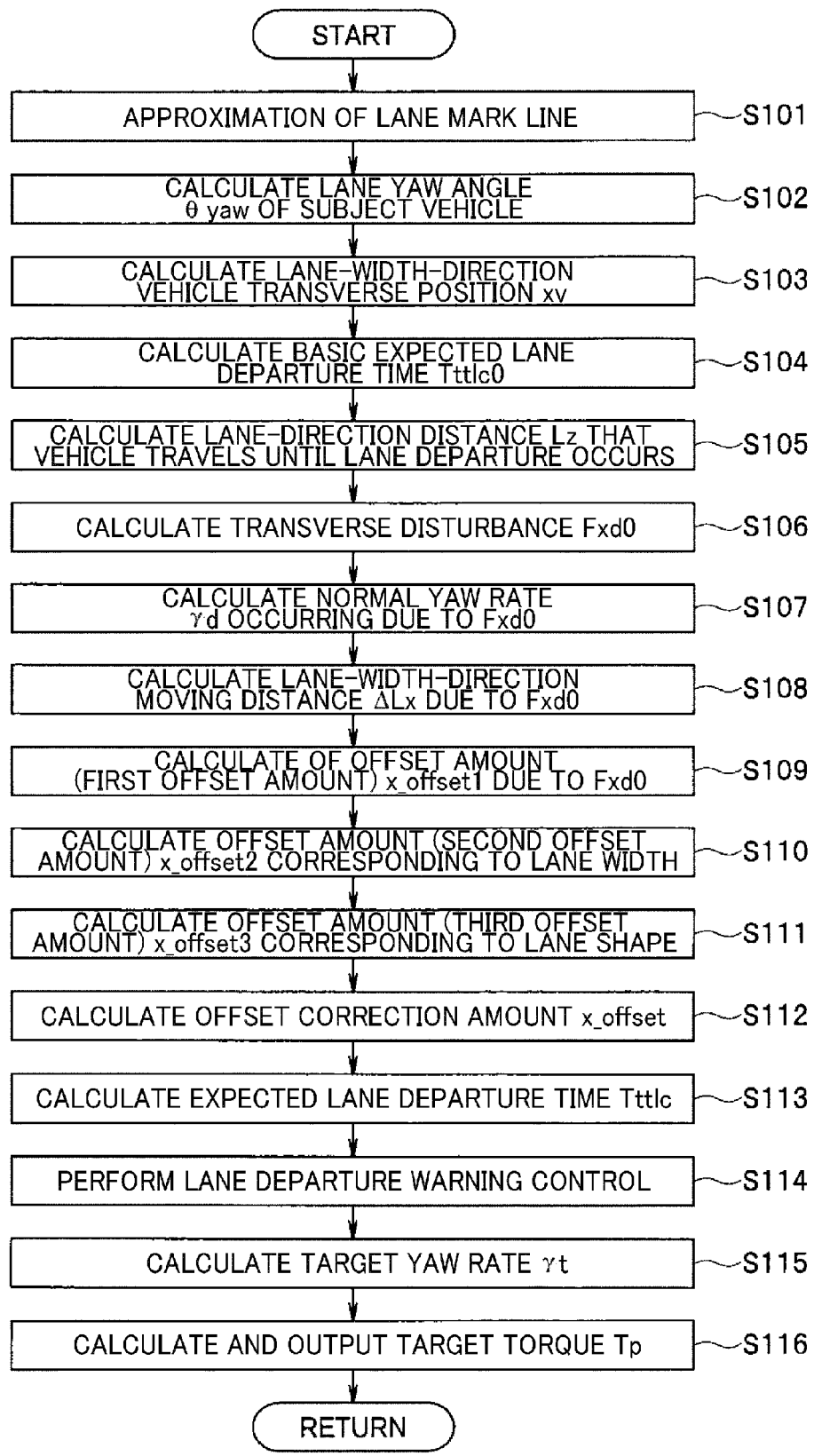
FIG. 2 is a flowchart of a lane departure prevention control program according to the implementation of the present invention.

Next, lane departure prevention control executed by the steering controller 20 will be described referring to the flowchart of FIG. 2.

First, in step 101 (hereinafter step abbreviated as "S"), the left and right lane lines acquired by the front image recognizer 31 are approximated.

The left lane line of the vehicle is approximated according to Equation (1) below by the least-squares method.

$$x = AL \cdot z^2 + BL \cdot z + CL \tag{1}$$

The right lane line of the vehicle is approximated according to Equation (2) below by the least-squares method.

$$x = AR \cdot z^2 + BR \cdot z + CR \tag{2}$$

Here, in Equations (1) and (2), "AL" and "AR" indicate the curvatures of respective curves, the curvature κ of the left lane line is 2·AL, and the curvature κ of the right lane line is 2·AR. "BL" and "BR" indicate inclinations in the width direction of the vehicle, of the respective curves, and "CL" and "CR" indicate the positions in the width direction of the vehicle, of the respective curves (see FIG. 3).

Subsequently, in S102, the lane yaw angle θyaw of the vehicle is calculated according to Equation (3) below.

$$\theta yaw = \tan^{-1}((BL+BR)/2) \tag{3}$$

Subsequently, in S103, the lane-width-direction vehicle transverse position xv that is the position of the vehicle from the center of the lane is calculated according to Equation (4) below.

$$xv = (CL+CR)/2 \tag{4}$$

Subsequently, in S104, the expected lane departure time in which the vehicle is expected to depart from the lane on the condition that the vehicle travels in the present travelling state is calculated according to, for example but not limited to Equation (5) below, as the basic expected lane departure time Tttlc0.

$$Tttlc0 = L/(V \cdot \sin(\theta yaw)) \tag{5}$$

Here, L is the distance (lane mark line-to-vehicle distance) from the lane mark line to the vehicle and is calculated according to, for example but not limited to, Equation (6) below.

$$L = ((CL-CR)-TR)/2 - xv \tag{6}$$

Here, TR is a tread of the vehicle. In the implementation of the present invention, the tire positions are used as the references for lane departure determination (see FIG. 3).

Subsequently, in S105, the lane-direction distance Lz that the vehicle travels until the vehicle departs from the lane is calculated according to, for example but not limited to, Equation (7) below.

$$Lz = V \cdot Tttlc0 \cdot \cos(\theta yaw) \tag{7}$$

Subsequently, in S106, the transverse disturbance Fxd0 resulting from the cant of the travelling path is calculated according to, for example but not limited to, Equation (8) below.

$$Fxd0 = m \cdot g \cdot \sin(\theta ca) \tag{8}$$

Here, m is a vehicle mass, g is an acceleration of gravity, θca is a cant angle of the road surface, and the cant angle θca is calculated according to, for example but not limited to, Equation (9) below.

$$\theta ca = \sin^{-1}((V \cdot \gamma - G)/g) \tag{9}$$

Here, the cant angle θca is not limited to the value calculated according to Equation (9) above. For example but not limited to, the cant angle may be calculated using a difference between the actual transverse acceleration G and a transverse acceleration derived from an equation of motion of the vehicle. Alternatively, a value obtained from map information of a navigation system (not illustrated) may be used as the cant angle.

Subsequently, in S107, a normal yaw rate γd occurring due to the transverse disturbance Fxd0 is calculated according to, for example but not limited to, Equation (10) below.

$$\gamma d = ((-(lf \cdot Kf - lr \cdot Kr) \cdot V)/(2 \cdot lw^2 \cdot Kf \cdot Kr \cdot (1+As \cdot V^2))) \cdot Fxd0 \tag{10}$$

Here, lf is a front shaft-to-center distance, lr is a rear shaft-to-center distance, lw is a shaft-to-shaft distance, Kf is cornering power of the front wheels, Kr is cornering power of the rear wheels, and As is steerability unique to the vehicle.

Subsequently, in S108, an amount of positional deviation (lane-width-direction moving distance) ΔLx is calculated. The amount of positional deviation ΔLx is an amount of positional deviation in a transverse direction (x-direction) on the condition that the vehicle turns along a normal circle in response to the transverse disturbance Fxd0 when the vehicle travels the lane-direction distance Lz until the vehicle departs from the lane, as calculated by Equation (7) in S105. The amount of positional deviation ΔLx is calculated by approximating the equation of a normal circle by the Taylor series of a quadratic equation according to, for example but not limited to, Equation (11) below.

$$\Delta Lx = (Lz^2/(2 \cdot V)) \cdot \gamma d \tag{11}$$

Subsequently, in S109, an offset amount corresponding to the transverse disturbance Fxd0 (that is, a correction amount capable of canceling a change in a travelling path in the lane width direction occurring due to the transverse disturbance Fxd0 acting on the vehicle so as to maintain an optimal lane departure preventing path) is calculated according to, for example but not limited to, Equation (12) below, as the first offset amount x_offset1.

$$x\_offset1 = -\Delta Lx \tag{12}$$

Figure 4:
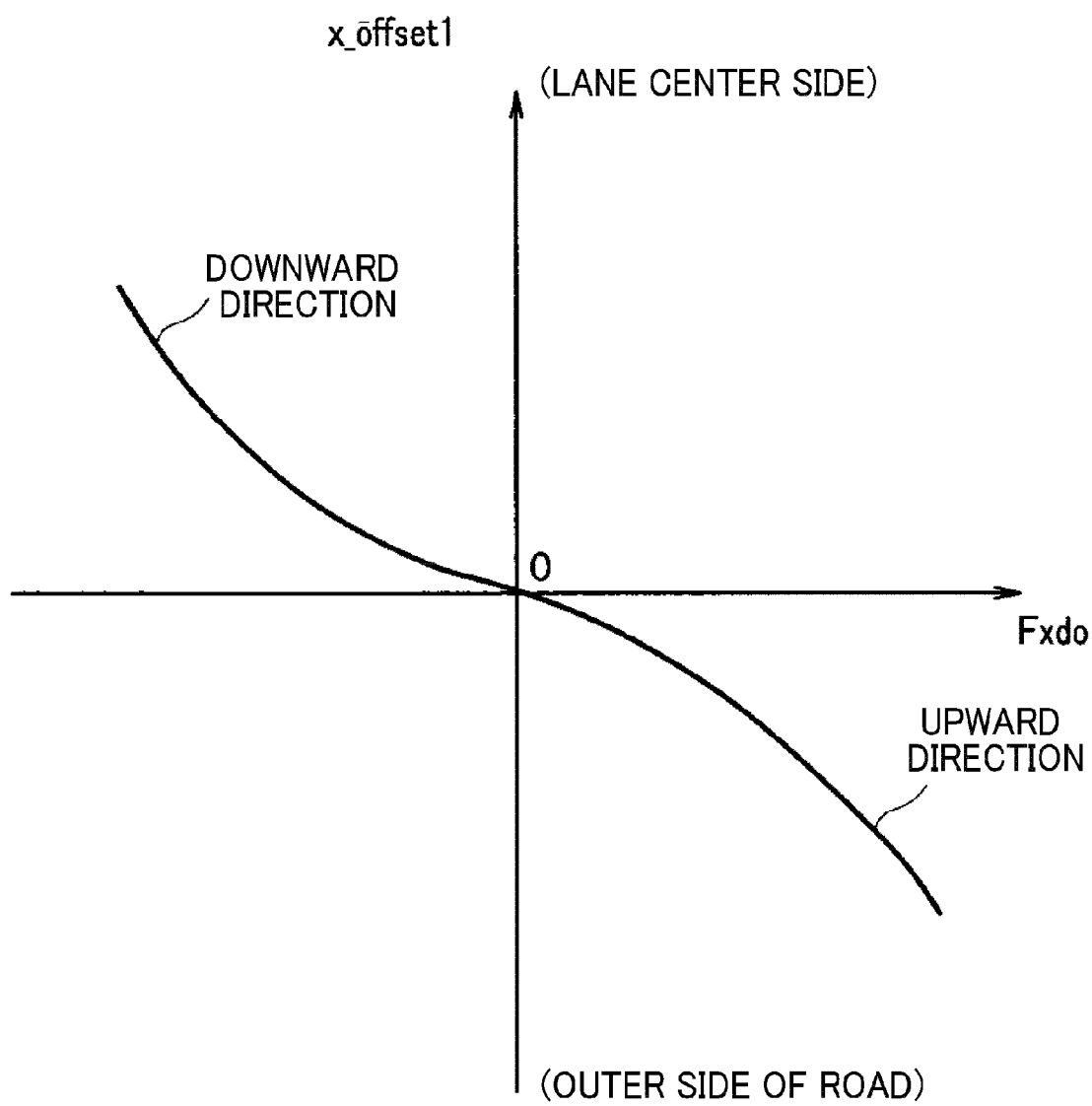
FIG. 4 illustrates an example of characteristics of a first offset amount x_offset1 according to the implementation of the present invention.

In the present implementation, the first offset amount x_offset1 corresponding to the transverse disturbance Fxd0 is calculated according to Equations (8) to (12) in the processes of S106 to S109. However, the first offset amount x_offset1 may be set according to, for example but not limited to, a characteristic diagram illustrated in FIG. 4 that has been set in advance through experiments and computations.

Figure 7:
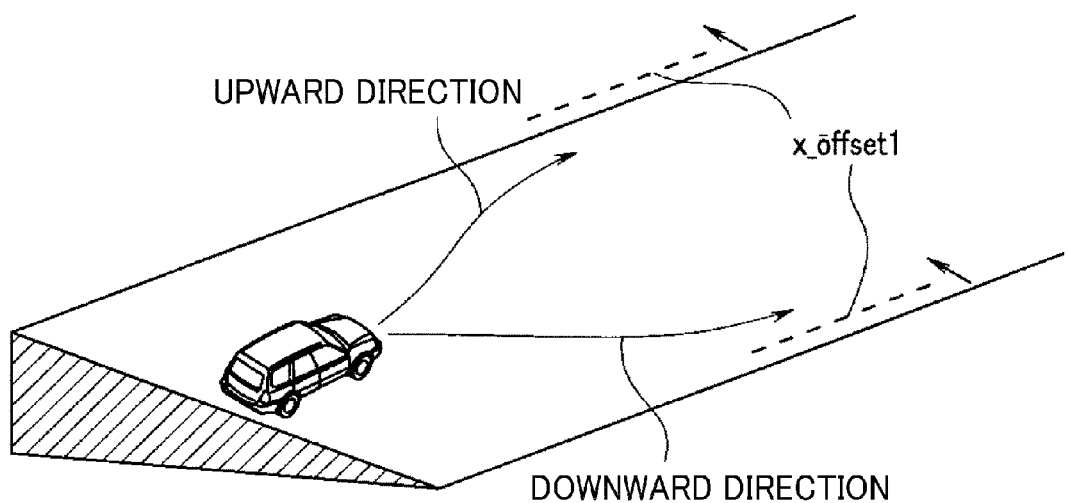
FIG. 7 illustrates lane mark lines offset by the first offset amount x_offset1 illustrated in FIG. 4.

The first offset amount x_offset1 corresponding to the transverse disturbance Fxd0 is set such that the larger the absolute value of the cant angle, the larger the offset amount toward the outer side of a lane mark line for correction in the up-slope of a cant, and that the larger the absolute value of the cant angle, the larger the offset amount toward the lane center of the lane mark line for correction in the down-slope of a cant (see FIG. 7).

Accordingly, for correction in the up-slope of a cant, the expected lane departure time Tttlc calculated by Equation (14) in S113 described later is corrected so as to increase, and the absolute value of the target yaw rate γt calculated by Equation (15) in S115 described later is corrected so as to decrease.

In contrast, for correction in the down-slope of a cant, the expected lane departure time Tttlc calculated by Equation (14) in S113 described later is corrected so as to decrease, and the absolute value of the target yaw rate γt calculated by Equation (15) in S115 described later is corrected so as to increase.

More specifically, according to conventional departure prevention control, during travelling on the up-slope of a cant, the acceleration of gravity acts in the direction for suppressing departure of a vehicle that is about to depart from a lane, and a lane departure preventing path follows a travelling path that is shifted toward the lane center so as to lean toward the lane center. In contrast, according to the conventional departure prevention control, during travelling on the down-slope of a cant, the acceleration of gravity acts in the direction for accelerating departure of a vehicle that is about to depart from a lane, and a lane departure preventing path approaches the lane edge, and in some case, it may be impossible to prevent a lane departure. When the influence of the transverse disturbance Fxd0 is not taken into consideration, the lane departure preventing path may vary, which may give the driver a sense of incongruity. Thus, in the present implementation, as described above, the first offset amount x_offset1 corresponding to the transverse disturbance Fxd0 is set such that the larger the absolute value of the cant angle, the larger the offset amount toward the outer side of a lane mark line for correction in the up-slope of a cant, and that the larger the absolute value of the cant angle, the larger the offset amount toward the lane center of the lane mark line for correction in the down-slope of a cant. By doing so, the lane departure preventing path can be maintained substantially constant in response to the transverse disturbance Fxd0 without giving the driver a sense of incongruity, and lane departure can be prevented reliably.

Figure 5:
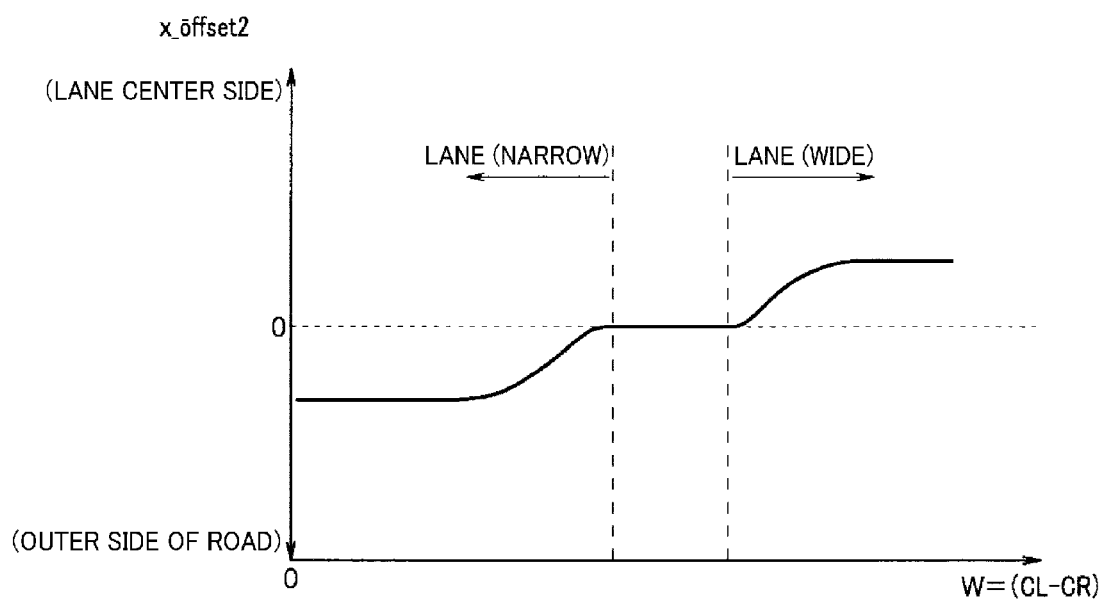
FIG. 5 illustrates an example of characteristics of a second offset amount x_offset2 according to the implementation of the present invention.

Subsequently, in S110, the offset amount corresponding to the lane width W (=CL−CR) (that is, the second offset amount x_offset2) is calculated according to, for example but not limited to, a characteristic diagram illustrated in FIG. 5 that has been set in advance through experiments and computations.

Figure 8A:
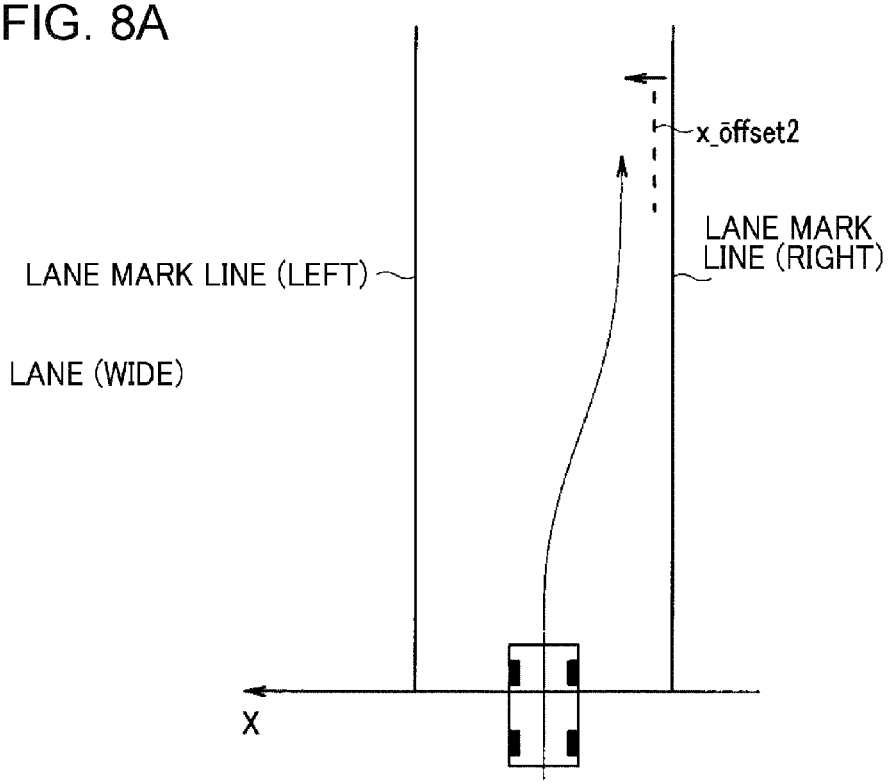
Figure 8B:
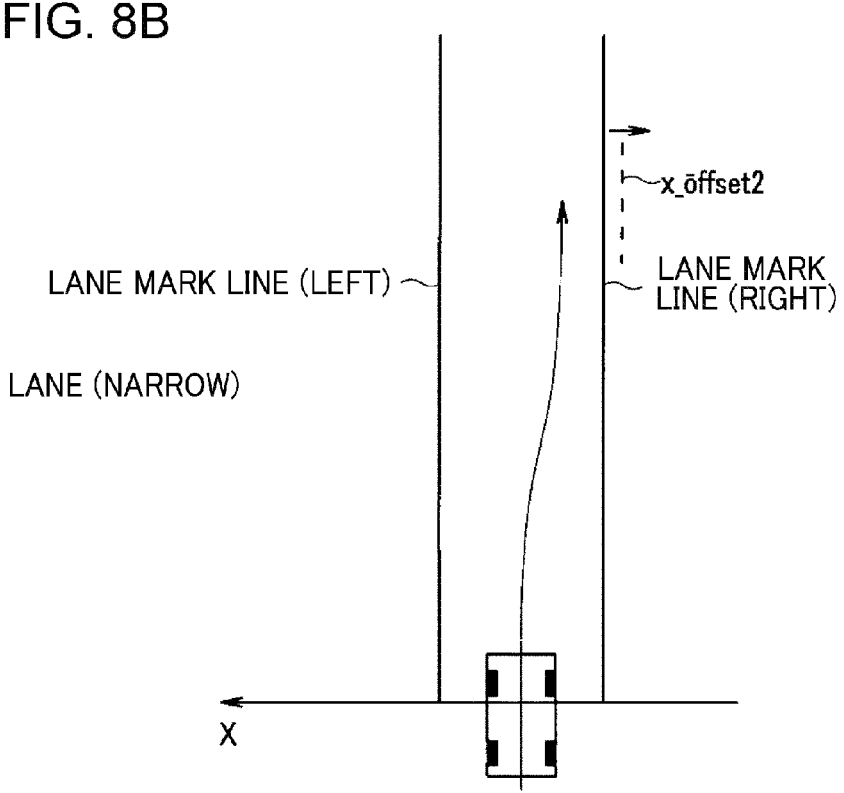

The second offset amount x_offset2 corresponding to the lane width W is set such that, when the vehicle is likely to depart from a lane having a larger lane width W than a preset value, the larger the lane width W, the larger the offset amount toward the lane center of the lane mark line (see FIG. 8A). On the other hand, when the vehicle is likely to depart from a lane having a smaller lane width W than the preset value, the second offset amount x_offset2 is set such that, the smaller the lane width W, the larger the offset amount toward the outer side of the lane mark line (see FIG. 8B).

Accordingly, when the vehicle is likely to depart from a lane having a lane width W larger than the preset value, the expected lane departure time Tttlc calculated by Equation (14) in S113 described later is corrected so as to decrease, and the absolute value of the target yaw rate γt calculated by Equation (15) in S115 is corrected so as to increase.

In contrast, when the vehicle is likely to depart from a lane having a lane width W smaller than the preset value, the expected lane departure time Tttlc calculated by Equation (14) in S113 described later is corrected so as to increase, and the absolute value of the target yaw rate γt calculated by Equation (15) in S115 is corrected so as to decrease.

That is, when the vehicle travels along a lane, it is desirable that the vehicle travels along the center of the lane regardless of whether the road has a large lane width or a small lane width. Since the lane departure prevention control uses the lane yaw angle θyaw of the vehicle and the lane mark line-to-vehicle distance L as control parameters, the lane mark line-to-vehicle distance L is small particularly in a lane having a small lane width W and the control is frequently performed. Thus, when the second offset amount x_offset2 corresponding to the lane width W is set in the above-described manner, the vehicle travelling along a lane having a large lane width W is controlled so as to travel stably along the center of the lane whereas the vehicle travelling along a lane having a small lane width is not subject to the control frequently so as to maintain travelling stability.

Subsequently, in S111, the offset amount corresponding to the lane shape (that is, the third offset amount x_offset3) is calculated according to, for example but not limited to, a characteristic diagram illustrated in FIGS. 6A and 6B that have been set in advance through experiments and computations.

Figure 6A:
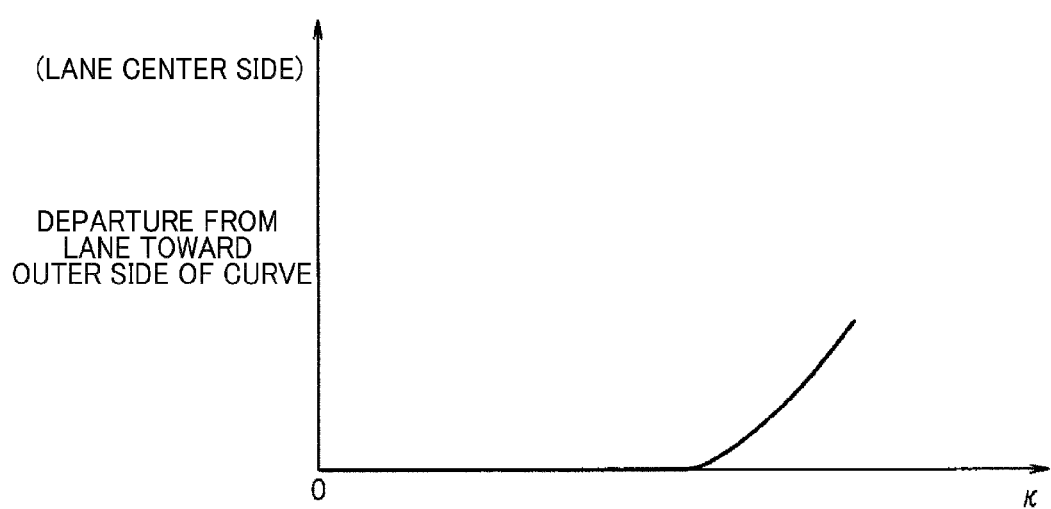
Figure 6B:
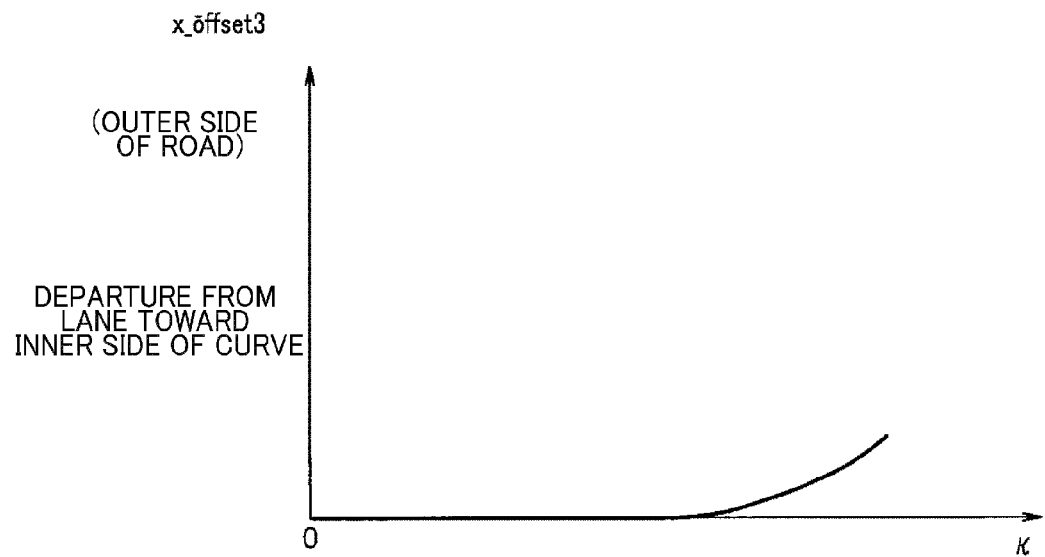

The third offset amount x_offset3 corresponding to the lane shape is set such that, when the vehicle is likely to depart from the lane toward the outer side of the curve of a lane, the larger the curvature κ of the curve, the larger the offset amount toward the lane center of the lane mark line (see FIG. 6A). On the other hand, when a vehicle is likely to depart from the lane toward the inner side of the curve of a lane, the third offset amount x_offset3 is set such that, the larger than curvature κ of the curve, the larger the offset amount toward the outer side of the lane mark line (see FIG. 6B).

Accordingly, when the vehicle is likely to depart from the lane toward the outer side of the curve of the lane, the expected lane departure time Tttlc calculated by Equation (14) in S113 described later is corrected so as to decrease, and the absolute value of the target yaw rate γt calculated by Equation (15) in S115 is corrected so as to increase.

In contrast, when the vehicle is likely to depart from the lane toward the inner side of the curve of the lane, the expected lane departure time Tttlc calculated by Equation (14) in S113 described later is corrected so as to increase, and the absolute value of the target yaw rate γt calculated by Equation (15) in S115 is corrected so as to decrease.

That is, when a vehicle is likely to depart from the lane toward the outer side of the curve of the lane, since the driver feels as if the outside of a road is immediately in front of the eyes of the driver, the driver may feel a sense of danger if a lane mark line is used as the reference for lane departure such as a straight road. Thus, when the vehicle is likely to depart from the lane toward the outer side of the curve of a lane, the larger the curvature κ of the curve, the larger the offset amount toward the lane center of the lane mark line so that the driver can pass through the curve without fear.

As a driver's driving method, when a driver passes through the curve of a lane, the driver often tries to pass through the curve safely by the "out-in-out" driving. When such "out-in-out" driving is considered, if the lane departure reference is set at the inner side of the curve of the lane as usual, the lane departure prevention control may control the vehicle to turn toward the center of the road, which may hinder the out-in-out driving. Thus, when the vehicle is likely to depart from the lane toward the inner side of the curve of the lane, the larger the curvature κ of the curve, the larger the offset amount toward the outside of the lane mark line so as not to interfere the out-in-out driving of the driver.

After the first, second, and third offset amounts x_offset1, x_offset2, and x_offset3 are calculated in S109, S110, and S111, a final offset amount x_offset is calculated according to, for example but not limited to Equation (13) below, in S112.

$$x\_offset = x\_offset1 + x\_offset2 + x\_offset3 \quad (13)$$

Subsequently, in S113, the expected lane departure time Tttlc obtained by correction is calculated according to, for example but not limited to, Equation (14) below.

$$Tttlc = (L - x\_offset)/(V \cdot \sin(\theta yaw)) \quad (14)$$

Subsequently, in S114, the expected lane departure time Tttlc is output to a warning controller 40 coupled to the steering controller 20. The warning controller 40 compares the expected lane departure time Tttlc with a predetermined value. When the expected lane departure time Tttlc is shorter than the predetermined value, a lane departure warning is output to the driver in the form of an audible warning such as, but not limited to, voice or chime sound or a visual warning such as, but not limited to, a signal on a monitor.

Subsequently, in S115, the target yaw rate γt is calculated according to, for example but not limited to, Equation (15) below as the target turn amount.

$$\gamma t = -\theta yaw/Tttlc \quad (15)$$

Subsequently, in S116, the target torque Tp is calculated according to, for example but not limited to, Equation (16) below, and is output to the motor driver 21 to drive the electric motor 12.

$$Tp = Kp \cdot (\gamma t - \gamma) + Ki \cdot \int (\gamma t - \gamma) dt + Kd \cdot d(\gamma t - \gamma)/dt \quad (16)$$

Here, Kp is a proportional gain, Ki is an integral gain, and Kd is a differential gain.

As described above, according to the present implementation, the lane yaw angle θyaw and the lane-width-direction vehicle transverse position xv are calculated, the expected lane departure time in which the vehicle is expected to depart from the lane on the condition that the vehicle travels in the present travelling state is calculated as the basic expected lane departure time Tttlc0, and the lane-direction distance Lz that the vehicle travels until the vehicle departs from the lane is calculated. The first offset amount x_offset1 of the lane mark line corresponding to the transverse disturbance Fxd0 resulting from a cant of a travelling path is calculated, the second offset amount x_offset2 of the lane mark line corresponding to the lane width W is calculated, and the third offset amount x_offset3 of the lane mark line corresponding to the lane shape is calculated. The expected lane departure time Tttlc is calculated based on a lane mark line corrected based on the first, second, and third offset amounts x_offset1, x_offset2, and x_offset3, and the target yaw rate γt and the target torque Tp are calculated. The electric power steering motor 12 is driven and controlled according to these calculated values. Due to this, the target yaw rate γt is corrected and calculated based on the first, second, and third offset amounts x_offset1, x_offset2, and x_offset3 and the target torque Tp based on the target yaw rate γt is output even when the vehicle departs from the lane in the upward or downward direction of a cant, the vehicle travels on lanes having different lane widths W, or the vehicle passes through a curve when a transverse disturbance such as a cant acts on the vehicle. Therefore, it is possible to prevent lane departure reliably without giving the driver a sense of incongruity by maintaining an optimal lane departure preventing path.

In the present implementation, the lane mark line is used as a departure determination line for determining departure from a lane. However, the present invention can be naturally applied to a case in which a departure determination line may be set, for example but not limited to, at a position shifted to the inner side of a lane from the lane mark line, and the departure prevention control may be performed based on the departure determination line.

In the implementation of the present invention, the position of the lane mark line is corrected based on three offset amounts including the first offset amount x_offset1 corresponding to the transverse disturbance Fxd0, the second offset amount x_offset2 corresponding to the lane width W, and the third offset amount x_offset3 corresponding to the lane shape. Alternatively, the position of the lane mark line may be corrected based on the first offset amount x_offset1 only. Alternatively, the position of the lane mark line may be corrected based on the first offset amount x_offset1 and the second offset amount x_offset2 only. Alternatively, the position of the lane mark line may be corrected based on the first offset amount x_offset1 and the third offset amount x_offset3 only. Further, the position of the lane mark line may be corrected based on other offset amounts including the first offset amount x_offset1.

The invention claimed is:

1. A lane departure prevention control system for a vehicle comprising:
   a lane detector that detects a lane on which the vehicle travels;
   a disturbance information detector that detects information on disturbance applied to the vehicle;
   a correction module that corrects position information of a departure determination line used for determining whether the vehicle departs from the lane, based on at least the information on the disturbance applied to the vehicle;
   a departure predictor that make a prediction of departure from the lane, based on position information on the departure determination line and a travelling state, the position information corrected by the correction module;
   a target turn amount calculator that calculates a target turn amount to be applied to the vehicle, required for preventing departure from the lane based on the prediction of the departure from the lane; and
   a target turn amount generator that generates the target turn amount to the vehicle, wherein
   the information on the disturbance detected by the disturbance information detector includes a cant angle of the lane, and
   when there is a possibility that the vehicle may depart from the lane in an upward direction of a cant, the correction module corrects the position of the departure determination line from which the vehicle departs, toward an outer side of a lane mark line and corrects the target turn amount calculated by the target turn amount calculator so as to decrease, and when there is a possibility that the vehicle may depart from the lane in a downward direction of the cant, the correction module corrects the position of the departure determination line from which the vehicle departs, toward a center of the lane and corrects the target turn amount calculated by the target turn amount calculator so as to increase.

2. The lane departure prevention control system for a vehicle according to claim 1, wherein the correction module corrects the position information on the departure determination line from which the vehicle departs, based on at least the information on the disturbance applied to the vehicle and a width of the vehicle, and when there is a possibility that the vehicle may depart from a lane having a larger lane width than a preset value, the correction module corrects the position of the departure determination line from which the vehicle departs, toward a center of the lane and corrects the target turn amount calculated by the target turn amount calculator so as to increase, and when there is a possibility that the vehicle may depart from a lane having a smaller lane width than the preset value, the correction module corrects the position of the departure determination line from which the vehicle departs, toward an outer side of a lane mark line and corrects the target turn amount calculated by the target turn amount calculator so as to decrease.

3. The lane departure prevention control system for a vehicle according to claim 2, wherein the correction module corrects the position information on the departure determination line from which the vehicle departs, based on at least the information on the disturbance applied to the vehicle and a shape of the lane, and when there is a possibility that the vehicle may depart from the lane toward an inner side of a curve of the lane, the correction module corrects the position of the departure determination line from which the vehicle departs, toward an outer side of a lane mark line and corrects the target turn amount calculated by the target turn amount calculator so as to decrease, and when there is a possibility that the vehicle may depart from the lane toward an outer side of a curve of the lane, the correction module corrects the position of the departure determination line from which the vehicle departs, toward a center of the lane and corrects the target turn amount calculated by the target turn amount calculator so as to increase.

4. The lane departure prevention control system for a vehicle according to claim 3, wherein the departure predictor calculates an expected lane departure time in which the vehicle is expected to depart from the lane, and the target turn amount calculator calculates the target turn amount, based on the expected lane departure time and a yaw angle of the vehicle in relation to the lane.

5. The lane departure prevention control system for a vehicle according to claim 2, wherein the departure predictor calculates an expected lane departure time in which the vehicle is expected to depart from the lane, and the target turn amount calculator calculates the target turn amount, based on the expected lane departure time and a yaw angle of the vehicle in relation to the lane.

6. The lane departure prevention control system for a vehicle according to claim 1, wherein the correction module corrects the position information on the departure determination line from which the vehicle departs, based on at least the information on the disturbance applied to the vehicle and a shape of the lane, and when there is a possibility that the vehicle may depart from the lane toward an inner side of a curve of the lane, the correction module corrects the position of the departure determination line from which the vehicle departs, toward an outer side of a lane mark line and corrects the target turn amount calculated by the target turn amount calculator so as to decrease, and when there is a possibility that the vehicle may depart from the lane toward an outer side of a curve of the lane, the correction module corrects the position of the departure determination line from which the vehicle departs, toward a center of the lane and corrects the target turn amount calculated by the target turn amount calculator so as to increase.

7. The lane departure prevention control system for a vehicle according to claim 6, wherein the departure predictor calculates an expected lane departure time in which the vehicle is expected to depart from the lane, and the target turn amount calculator calculates the target turn amount, based on the expected lane departure time and a yaw angle of the vehicle in relation to the lane.

8. The lane departure prevention control system for a vehicle according to claim 1, wherein the departure predictor calculates an expected lane departure time in which the vehicle is expected to depart from the lane, and the target turn amount calculator calculates the target turn amount, based on the expected lane departure time and a yaw angle of the vehicle in relation to the lane.

9. A lane departure prevention control system for a vehicle comprising:

a pair of cameras configured to capture stereo images in front of a vehicle;

a stereo image processor, configured to receive and process stereo images from the pair of cameras and generate a distance image;

a velocity sensor;

a yaw rate sensor;

a transverse acceleration sensor;

a controller, configured to:

detect information on disturbance applied to the vehicle, including a cant angle of the lane, based on information from one or more of the velocity sensor, the yaw rate sensor, the transverse acceleration sensor, and the stereo image processor;

correct position information of a departure determination line used for determining whether the vehicle departs from the lane, based on at least the information on the disturbance applied to the vehicle, and, predict a departure from the lane, based on position information on the departure determination line and a travelling state, the position infmniation corrected by the correction module, calculate a target turn amount to be applied to the vehicle, required for preventing departure from the lane based on the prediction of the departure from the lane, when there is a possibility that the vehicle may depart from the lane in an upward direction of a cant, correct the position of the departure determination line from which the vehicle departs, toward an outer side of a lane mark line and correct the target turn amount calculated by the target turn amount calculator so as to decrease, and when there is a possibility that the vehicle may depart from the lane in a downward direction of the cant, correct the position of the departure determination line from which the vehicle departs, toward a center of the lane and correct the target turn amount calculated by the target turn amount calculator so as to increase; and an electric power steering, configured to generate the target turn amount to the vehicle.

* * * * *